Patented Sept. 8, 1931

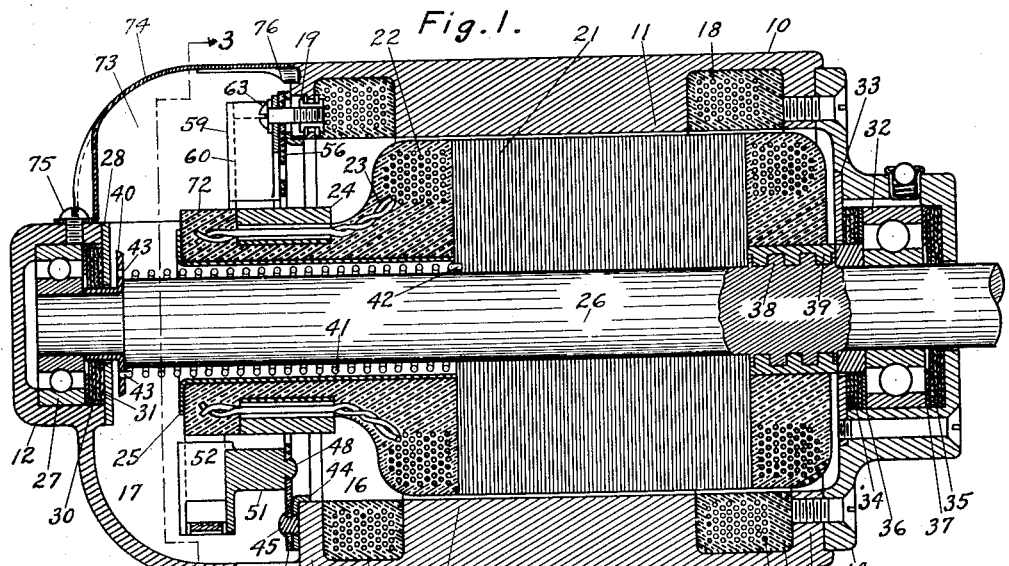

1,822,264

UNITED STATES PATENT OFFICE

VINCENT G. APPLE, OF DAYTON, OHIO

DYNAMO ELECTRIC MACHINE

Application filed June 14, 1928. Serial No. 285,368.

My invention relates more particularly to improvements in that type of dynamo electric machine which operates at a more or less variable current output, yet must deliver current against a substantially constant resistance, as when charging a storage battery, and one object of my invention is to provide a dynamo having as part thereof means for preventing the current strength from reaching too high a value and means for opening the charging circuit of the dynamo when its current strength has reached a value so low as to be overcome by the aforesaid substantially constant resistance.

Another object is to provide a dynamo wherein the several elements are so constructed that suitable connection may be had therebetween without having any exposed or visible wires connecting one to another.

Another object is to provide a dynamo wherein all windings and all terminals thereof are imbedded in a solid mass of insulating material, to hold them in fixed relation and to protect them against the effect of oil, moisture, vibration, breakage or other injury.

Other objects will be apparent from the following description, reference being had to the drawings, wherein—

Fig. 1 is a longitudinal cross section thru my dynamo on line 1—1 of Fig. 3.

Fig. 2 is an end view taken from the commutator end.

Fig. 3 is a cross section taken on line 3—3 of Fig. 1.

Fig. 4 is a fragmentary cross section on line 4—4 of Figs. 2 and 3.

Fig. 5, is a fragmentary cross section taken on line 5—5 of Fig. 3.

Similar numerals refer to similar parts thruout the several views.

Referring to the drawings a frame 10 has a series of poles 11, 11 etc. One end of frame 10 is substantially closed by flange 13 which supports bearing head 14. A partition 15 extends inwardly from frame 10 dividing it into two compartments 16 and 17. Coils 18 wound about poles 11 are, in the instant case, connected in series with each other, one end of said series being connected to contact 19 which is securely fastened to, but electrically insulated from frame 10, the other end of the series being electrically connected to said frame. If desired more contacts may be supplied so that coils 18 may be connected in parallel and the circuit which, in the instant case, has one end connected to the frame may have both ends thereof connected to insulated terminals similar to terminal 19.

Prior to winding coils about poles 11, the frame is bored thru flange 13, pole 11 and partition 15 so that after the coils are in position a cylindrical plug may be inserted to extend thru the bored portions and a fluid insulating material may then be poured or pumped into the space left by said coils and hardened or allowed to harden by heat or otherwise to form a solid mass wherein insulating material extends about and between the wires of said coils, as at 20, to bind them in position and protect them from the effects of oil, moisture, vibration and physical injury. After the insulating material is sufficiently hard the plug is removed from the frame and compartment 16 comprising the field element is complete, leaving compartment 17 available to contain other necessary parts of the dynamo.

The armature, which is of suitable diameter to clear within poles 11, has a core composed of a plurality of laminæ 21 cemented together. Windings 22 are laid in openings in the core as in ordinary practice, a suitable number of leads 23 being allowed to extend from the windings. Commutator bars 24 corresponding in number to the number of leads are provided, one bar being suitably joined to each lead. The structure is then placed in a mold, the mold being so constructed that all parts of the armature are thereby held in correct relation, and a treatment similar to that given the field is applied, namely, pouring or pumping a fluid insulating material into the space left by the other parts of the armature to fill all voids within the mold not occupied by said other parts, and at the same time to encase the armature in an armor of insulating material for protection against the effect of moisture, oil, vibration and other injuries.

The flanged ferrule 25 which is assembled within the mold with the other parts assists in keeping the core properly located while molding is being effected and affords protection for the end of the armature afterward. The commutator bars may contain notches or grooves or they may be otherwise formed to better engage the insulating material to retain their position under centrifugal action.

The armature shaft 26 is journaled at one end in ball bearing 27 supported in hub 12, a plate 28 held in place by screws 29 encloses the hub, a cup 30 fills the space between plate 28 and ball bearing 27 to limit endwise motion of shaft 26 and a felt washer 31 within cup 30 retains the oil with the hub and excludes foreign matter therefrom. At the other end of shaft 26 ball bearing 32 is supported in bearing head 14 which is enclosed by plate 33.

Felt washers 34 and 35 and metal washers 36 and 37 fill the space within bearing head 14 not taken by ball bearing 32. The felt washers retain the oil, exclude foreign matter and permit of a limited inequality in endwise expansion from unequal heating of shaft 26 and frame 10 without cramping the bearing.

Shaft 26 extends thru and beyond bearing head 14 to support the pulley or other driving means not shown. Near one end of shaft 26 a multiple thread 38 is cut integral therewith and a suitable nut 39 is secured in some manner to the armature. The nut may be fastened directly to the core, or it may be made of hexagonal or other polygonal stock and secured to the armature by supporting it in correct position at the time the armature is molded as hereinbefore described.

The threads of the shaft and nut are preferably of coarse pitch so that the angle of inclination of the threads with the axis of the shaft gives the thread on the shaft an appearance somewhat similar to a helical gear.

Near the other end on shaft 26 an oil throw 40 is securely fastened. A spring 41 bears at one end against the armature core and at the other end against the oil throw 40 so that no power is lost by friction as would be the case if the reaction of the spring were taken by the frame or other non-rotating member. Except as limited by thread 38, nut 39 and spring 41 the armature is free to revolve on shaft 26.

While not entirely necessary to carrying out my invention, I prefer that a hook be formed by bending the wire at one end of spring 41, the hook to be entered in a small hole in the core as at 42 and a similar hook at the opposite end may enter a small hole as at 43 in oil throw 40, and in this way the spring may be caused to exert not only an endwise pressure on the armature but also a turning effort thereon. By having a series of small holes as at 43 spaced around the flange of the oil throw a variable spring effort may be had by changing the hook at 43 from one hole to another.

In the drawings the armature is shown in the position it assumes when the dynamo is at rest or when it is generating little or no electromotive force, the armature core being shifted axially to a position out of alignment with poles of the dynamo field. It is apparent, however, that when a forward turning movement of considerable strength is applied to shaft 26, and the armature resists forward turning movement sufficiently, spring 41 will be twisted and endwise compressed by the turning of thread 38 in nut 39 and the armature thus shifted axially to a position directly under the field poles, the amount of such shift being limited by contact of ferrule 25 with oil throw 40.

Mounted on partition 15 and exending into compartment 17 of frame 10 is the brush carrying means. A metal ring 44 rests against the partition and pilots into the bore thereof. Secured to ring 44 by rivets 45 and 46 is a member 47 of sheet insulating material and secured to member 47 by riveting at 48, 49, and 50 is a metal brush holder 51 which carries two brushes 52 and 53 of the same polarity. By reason of member 47 being of insulating material brush holder 51 is securely fastened to, yet electrically insulated from, ring 44.

Mounted directly against and in electrical contact with ring 44 is a metal holder 54 containing brushes 55 of polarity opposite to that of brushes 52 and 53. At another position on ring 44 a member 56 of sheet insulating material is secured by rivets 57 and 58. A metal brush holder 59 containing brush 60 is mounted on member 56 and has pins 61 and 62 extending into a slot in said member.

A screw 63 connects brush holder 59 to one end of the field winding thru contact 19. Holder 59 and member 56 are slotted as at 64 to clear screw 63, and ring 44 has a wider slot 65 to insure electrical separation of said ring from screw 63.

Brush springs 66 maintain proper contact between the brushes and commutator. A binding post 67 is insulated from frame 10 by insulating bushing 68 and insulating washers 69. A clamping screw 70 threaded into binding post 67 makes electrical contact between said binding post and brush holder 51 by bearing on pad 71.

By loosening screws 63 and 70 the brushes may be circumferentially adjusted to such limits as is allowed by the slotted portion around screw 63, and by then first tightening screw 70, brush holder 59 thru which the field winding is energized may be separately circumferentially adjusted to regulate the current output of the dynamo at higher speeds.

This means of regulation wherein a brush supplying energy from the armature to the field winding is placed relative to the other brushes in a position off of normal so that the current collected thereby varies more or less in inverse ratio as the speed of the dynamo changes is common practice where the driving means varies over a wide range of speeds. It is readily seen that with a field and brush construction as shown and described the various connections between the several parts of the dynamo are made without loose or exposed wires or flexible leads such as are used in common practice.

A cylindrical portion 72 of the armature equal in diameter to the commutator extending outwardly therefrom is composed of insulating material and may be provided at the time of molding the armature by properly proportioning the mold, or may be separately made and attached to the commutator afterward. When the dynamo is at rest or when it is generating very little current the armature remains in the axially shifted position shown in Fig. 1 and brushes 52 and 53, being spaced a considerable distance from ring 44 by brush holder 51, rest upon portion 72.

As the charging circuit is maintained thru binding post 67, screw 70, and brushholder 51 it is obvious that the charging circuit is broken whenever the armature is in the shifted position shown in Fig. 1. Brush holder 59 thru which current is supplied to the field winding is relatively closer to ring 44 and in consequence remains on the commutator in any position which the armature may take. Brush holders 51 and 59 are of the same polarity while brush holder 54 containing two brushes 55, one of which is always on the commutator, is of opposite polarity.

It is obvious that while the external circuit is broken when the armature is axially shifted as shown in the drawing the field circuit is always across the armature in any position it may assume and that by properly proportioning the shifting means, 38, 39 and 41 with the winding the shift can be made to take place at a predetermined potential, the commutator and brushes thus composing an automatic switch in the charging circuit which opens or closes at a selected point in potential variation, but while I have shown the commutator and brushes as composing a switch which thus opens and closes the charging circuit, I consider that any insulated contact points so placed as to constitute a switch which may be opened and closed by the movement of the armature relative to the shaft will come within the scope of my invention.

The operation of my dynamo is substantially as follows: Rotative motion is imparted by a power source, to shaft 26. Because of spring 41 the armature remains in the shifted position shown in Fig. 1 as long as it is being driven forward at relatively low speed. Since the field winding is at all times connected across the armature a potential is built up across the field by residual magnetism, as in any dynamo.

When, however, the speed and consequent potential is increased to a predetermined point the armature resists turning movement to such extent that spring 41 is overcome and thread 38 turning within nut 39 shifts the armature axially until limited, by contact of ferrule 25 with oil throw 40, in which position brushes 52 and 53 connect the armature to the charging circuit. When the rotative speed and consequent potential are again lowered spring 41 exerts both a turning and endwise force to return the armature to the position shown in the drawing when the charging circuit is again open.

The solenoid effect of the field on the armature assists the armature in assuming its charging position thereby providing a double means to insure action at the proper time, and the spring 41 in returning the armature to open circuit position is assisted by the reversal of the current flow from the battery or other source which makes a motor of the dynamo when the potential falls below that of the external circuit thus providing two separate means, either or both of which may act to open the charging circuit at a suitable time, since a gain in speed of the armature relative to shaft 26 causes nut 39 to turn on thread 38 to move the armature axially to the starting position.

In fact the dynamo would open and close the circuit if the spring 41 were broken since the armature would resist turning movement of the shaft from inertia alone and thus shift backwardly to close the external circuit, and if the armature was not then generating sufficient current as a dynamo it would instantly act as a motor operated by current from the battery or other source to open the circuit and continue doing so as often as the circuit was closed until a speed was reached greater than that at which the armature revolved as a motor. If the speed at which the armature is driven decreases suddenly as is usually the case the momentum of the armature acts to open the circuit thus adding further to the effort of the spring and the motoring effort of the armature. A portion of frame 10 may be cut away as at 73 or otherwise, for convenient access to parts therein and a lid 74 held by screw 75 and dowel 76 may close the opening when desired.

I am aware that prior to my invention charging dynamos have been made embodying some of the features herein shown and I therefore do not claim these features separately or broadly but aim to confine my claims to such combinations of the several features as together produce a new and useful result.

Accordingly, I claim—

1. A dynamo electric machine comprising a frame containing a field element, a shaft having bearing at one end of said frame, means to revolve said shaft, means to keep said shaft from shifting endwise in said frame, a thread carried on said shaft and between said bearings, an armature mounted on said shaft to revolve therewith, a nut secured to said armature engaging said shaft thread, a spring having one end secured to said shaft and the other end secured to said armature normally keeping said nut at one extremity of said thread, a commutator secured to said armature, an extension of insulating material equal in diameter to said commutator secured to and extending outwardly therefrom, a brush of one polarity normally resting on said extension, a brush of the other polarity normally resting partly on said extension and partly on said commutator, and a circumferentially adjustable regulating or field excitation brush of the same polarity as the first mentioned brush normally resting on said commutator, the tension of the aforesaid spring being so adjusted that the magnetic effort of the machine in generating a predetermined potential as a dynamo will resist the driving effort sufficiently to cause relative movement of the threaded parts to compress and twist said spring when the armature will be shifted until all brushes rest on the commutator and the charging circuit will be closed and when said spring expands and untwists it will return the armature to the starting position and the charging circuit will be open.

2. In a dynamo electric machine armature, a shaft, a core mounted for limited rotation on said shaft, a winding on said core, a thread on said shaft at the end of the core, a nut surrounding said thread, a winding head surrounding said nut, and means securing said nut to said armature comprising a single mass of cementitious insulation extending outwardly through and about the turns of the winding head and inwardly about said nut.

3. In a dynamo electric machine armature, a core, a winding on said core extending axially therebeyond, leads emanating from said winding, individual commutator segments attached to said leads, and a single mass of cementitious insulation extending between and about the turns of the winding, the segments and the leads, forming a commutator of the segments and a cylinder of insulation at the outer ends of the segments equal in diameter to said commutator.

In testimony whereof I hereunto set my hand.

VINCENT G. APPLE.